(12) United States Patent  
Keating (10) Patent No.: US 8,886,681 B2  
(45) Date of Patent: Nov. 11, 2014

(54) DATA ANALYTICS SYSTEM

(76) Inventor: Andrea Keating, Clarksville, MD (US)

( * ) Notice: Subject to any disclaimer, the term of this patent is extended or adjusted under 35 U.S.C. 154(b) by 133 days.

(21) Appl. No.: 12/805,858

(22) Filed: Aug. 20, 2010

(65) Prior Publication Data

US 2012/0047183 A1 Feb. 23, 2012

(51) Int. Cl.  
*G06F 17/30* (2006.01)  
*H04N 5/222* (2006.01)

(52) U.S. Cl.  
CPC ..................... *H04N 5/222* (2013.01)  
USPC ........................................................ 707/802

(58) Field of Classification Search  
CPC ................... G06F 17/30029; G06F 17/30244; G06F 17/30265; G06F 17/3002; G06F 17/30091; G06F 17/30; G06F 17/30017; G06F 17/30247; G06F 17/30876  
See application file for complete search history.

(56) References Cited

U.S. PATENT DOCUMENTS

| | | | |
|---|---|---|---|
| 7,222,125 B2 * | 5/2007 | Fujihara | 1/1 |
| 8,194,993 B1 * | 6/2012 | Chen et al. | 382/254 |
| 2005/0086065 A1 * | 4/2005 | Maion et al. | 705/1 |
| 2009/0083282 A1 * | 3/2009 | Benitez et al. | 707/10 |

* cited by examiner

*Primary Examiner* — Dinku Gebresenbet  
(74) *Attorney, Agent, or Firm* — Vorys, Sater, Seymour and Pease LLP; William L. Kilma (57) ABSTRACT

A data analytics system for manipulating and analyzing data and usable in preventing instances of incompatibility as desired, is disclosed.

27 Claims, 3 Drawing Sheets

DATA ANALYTICS SYSTEM

FIELD OF INVENTION

The present invention generally relates to data analytics systems for manipulating and analyzing data. More specifically, the present invention relates to data structure configurations useable in preventing instances of incompatibility as desired.

BACKGROUND OF INVENTION

There is a great need in the media production and other industries to bridge the compatibility gap between the equipment manufacturers supply to the marketplace, and the equipment outputs that end users handle. Because there are multiple equipment manufacturers, which produce multiple products and sub-products with varying features, the number of different and varying outputs is staggering. For end users of these outputs, equipment and output compatibility on their end becomes of crucial importance because it significantly impacts cost, on-time delivery and other service deliverable factors.

SUMMARY OF INVENTION

The present invention satisfies the foregoing and other needs not currently met by existing computer systems. This is accomplished, in an exemplary embodiment, by configuring a data structure with one or more types of fields that are relationally linked with one or more functionalities and negative limitations in order to prevent instances of incompatibility.

In one aspect, a configuration of the data structure of the present invention relationally links one or more location of a company together, thereby allowing for the capability of linking and/or identifying, for example, any hard or soft equipment assigned or located at each location of a company.

In another aspect, a configuration of the data structure of the present invention relationally links the hardware and software outputs of each pre-production, production and post-production capabilities on a location basis, thereby allowing for the capability of linking and/or identifying, for example, any production or post-production equipment or capabilities on a location basis.

In yet another aspect, a configuration of the data structure of the present invention relationally links all (hard or soft) outputs of any company to any pre-production, production or post-production equipment input/outputs on the basis of manufacturer, input connections, output connections, model, format, file format, media, additional equipment, computer hardware and software, for example.

A consequence of the above and other configurations of the data structure of the present invention, including use of negative limitations on certain data fields, translates into the capability of preventing costly incompatible equipment connections.

There has been thus outlined, rather broadly, the features of the invention in order that the detailed description thereof that follows may be better understood, and in order that the present contribution to the are may be better appreciated. There are, of course, additional features of the invention that will be described further hereinafter.

In this respect, before explaining at least one embodiment of the invention in detail, it is to be understood that the invention is not limited in its application to the details of construction and to the arrangements of the components or data structures set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may be readily used as a basis for the designing of other structures, methods and systems for carrying out the several purposes of the present invention. It is important, therefore, that equivalent constructions insofar as they do not depart from the spirit and scope of the present invention, are included in the present invention.

For a better understanding of the invention, its operating advantages and the aims attained by its uses, the nature of the invention may be more clearly understood by reference to the accompanying drawings and descriptive matter, which illustrate preferred embodiments of the invention.

BRIEF DESCRIPTION OF THE PREFERRED EMBODIMENTS

DETAILED DESCRIPTION OF PREFERRED EMBODIMENTS

In accordance with a preferred embodiment of the present invention, an exemplary system useful in analyzing and manipulating data compatibility is disclosed. For ease of discussion and understanding, the invention will be described with application to the media industry in terms of television and film crew companies and operators that produce commercials, news clips, training videos, etc., for news corporations, public relations firms, and other companies. However, the present invention is applicable to other industries as well.

In the context of film/video production in the media industry, one element of the film or video production process—whether shooting a blockbuster movie or a 30-second Super Bowl television commercial—is the camera. Generally, professional grade cameras, or camera equipment, vary by manufacturer, model and type, from which depends camera format and file format. These variations number in the thousands.

For example, there are a dozen or so professional film/video camera equipment manufacturers on the market such as Arriflex, Canon, Panasonic, Sony, JVC, etc. And each manufacturer produces a variety of different models (or families of models) to choose from, depending on desired features and uses, for example.

From a functional perspective, camera equipment is often categorized by type, which are also many. Five types of camera equipment, for example, are: (1) film cameras such as the Arriflex 35 mm film camera or the Bolex 16 mm film camera; (2) digital video (DVC) cameras such as the Panasonic DVC PRO 50; (3) high-definition (HD) cameras such as the Sony, JVC or Canon HDV camera; (4) digital beta (Digibeta) cameras such as the Sony Digi-Beta camera; and (5) dockable cameras by JVC, Hitachi, Ikegami and Sony.

Interestingly, each type of camera is made by one or more manufacturers, which generally produces one or more camera models in each type. It is not unusual for one camera equipment manufacturer to have six or seven different camera models of a popular type of camera. One basis for these differing camera models is proprietary technology developed by the manufacturer that delivers higher quality film or video footage using less storage space, for example, or some such other desired camera feature.

Accordingly, the way in which film/video footage is recorded varies, depending on which type of camera or which camera model, and which camera manufacturer, the camera operator uses in the shoot. The term used to describe how footage is recorded within camera equipment is camera format. As one can imagine, the number of camera formats grows exponentially as competition increases and each manufacturer continues to roll out new camera equipment in the market.

Closely related to camera format is the file format because file format has to do with how the camera format outputs, from the camera equipment, the actual footage for subsequent playback, viewing, editing and the like. In other words, camera format refers to coded instructions purposed for recording footage internally within the camera equipment. File format refers to coded instructions purposed for playing back and viewing footage external to the camera equipment. Like camera format, file format depends on the camera equipment manufacturer/model and the type of camera equipment used because of proprietary technology developed by each manufacturer.

Closely related to both camera format and file format is media because a camera manufacturer's proprietary technology also drives which type of media supports which file format and which camera format, for example. A media is a storage device useful for storing video footage. Like the number of camera manufacturer's, camera models, camera formats and file formats, there is a wide variety of media types. All of these factors add to the complexity of the decision logic and data structure of the present invention.

Figure 1:
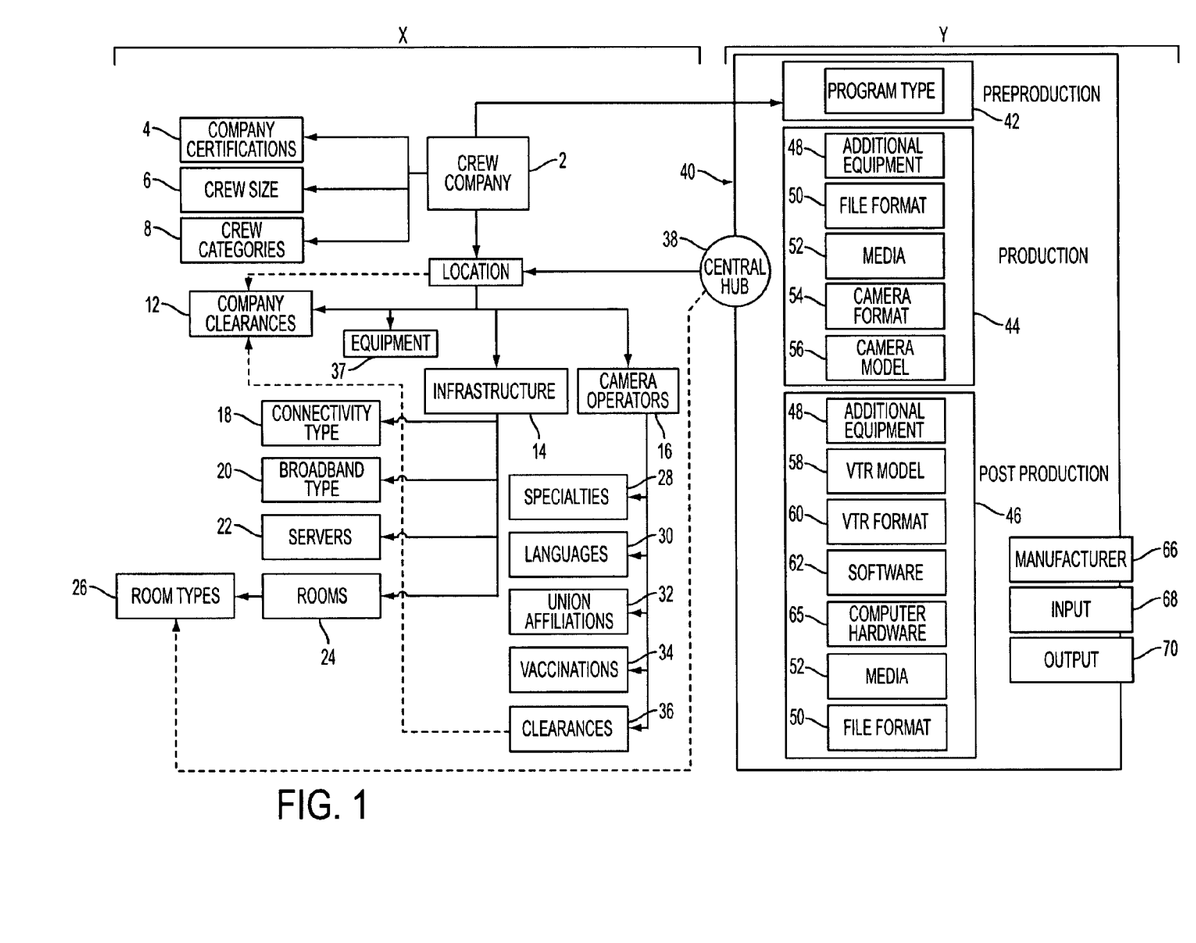
FIG. 1 is an exemplary diagram of a data structure for a first entity in accordance with a preferred embodiment of the present invention.

Referring now to FIG. 1, there is shown an exemplary diagram of a data structure for a first entity in accordance with a preferred embodiment of the present invention. For discussion purposes, the first entity is labeled a crew company 2. The inputs of the crew company is represented by X, and the outputs by Y.

The data structure is populated by various pieces of information about a crew company 2. For example, as depicted, information about the company's certifications 4, size 6 and categories 8 may be included.

Company certifications 4 include information on industry certifications, such as designation as a small business, woman-owned, minority-owned and the like. Crew size 6 refers to the total number of individuals working at/for the crew company 2, whether they are employees, independent contractors or consultants.

Crew categories 8 refer to the type of film/video/movie/camera shooting that a crew company 2 specializes in. Like the expertise area or specialty 28 of a camera operator 16, crew categories 8 include, but are not limited to, underwater shooting, aerials, web streaming, training-related shooting, medical-related shoots, high-technology shooting, etc. As one can appreciate, the specialized skills in performing underwater shooting are quite different from those involved in shooting a 30-second football commercial, or aerial shooting over the Grand Canyon.

Generally, each crew company 2 has at least one location or facility 10 in which it operates. Each location 10 is preferably defined by its name, address, city, state, zip code and country. At each location 10, the crew company 2 is usually organized into departments to which people are assigned. However, the data structure of the present invention ignores the organizational hierarchy of each company's department. Nevertheless, the following categories of information or data are preferably linked to location 10.

As depicted in FIG. 1, the data structure for each location 10 of crew company 2 allows for input on one or more company security clearances 12, infrastructure capabilities 14, and camera operators 16 associated with the facility.

Each location 10 may or may not have security clearance 12. A security clearance 12 is a determination by the United States government that a company or person is eligible for access to classified information. The three levels of security clearances 12 are confidential, secret and top secret. Populating the data structure with this information allows, for example, decision logic querying as to whether a desired facility 10 of crew company 2 is cleared or has the appropriate security clearance for performance of selected government project(s).

Regarding infrastructure 14, the data structure associated with each location 10 is preferably populated with one or more pieces of information or data concerning technology connectivity 18, broadband 20, servers 22, and rooms 24. For example, the type of connectivity 18 available at location 10 generally includes fiber-optic and satellite transmissions of digital, video, television and radio content. Accordingly, the data structure here is populated with information on the manufacturer, model name or number and size for each type of transmission. In one embodiment, the type of connectivity 18 available at location 10 may be grouped into two categories: satellite transmission, or video delivery and video transmission services companies, such as Vyvx.

The type of broadband 20 capabilities available at location 10 include various wired and mobile high-speed transmission technologies including Digital Subscriber Line (DSL), cable modem, fiber, wireless, satellite, and broadband over powerlines (BPL).

For purposes of this application, DSL-based broadband also includes other types of DSL transmission technologies, such as Asymmetrical Digital Subscriber Line (ADSL), Symmetrical Digital Subscriber Line (SDSL), High data rate Digital Subscriber Line (HDSL), and Very High data rate Digital Subscriber Line (VDSL). Cable modem refers to cable modem broadband service that uses the same coaxial cables that delivers picture content and sound to the television. Fiber refers to fiber optic technology, which converts/sends electrical signals carrying data to light through small transparent glass fibers. Wireless refers to wireless broadband, which may be mobile or fixed, and includes Wi-Fi networks or wireless local area networks (WLAN). Satellite refers to satellite broadband, which is another form of wireless broadband, useful in serving remote or sparsely populated areas. Broadband over Powerline (BPL) refers to the delivery of broadband over existing electric power lines/grid. Accordingly, data about each broadband type populates the data structure. In one embodiment, the data populating the data structure for the above technologies may be classified as either slower than T1, and T1 or faster.

The type of server 22 capabilities available at location 10 may include, for example, relational database management system servers such as structured query language (SQL) servers. Accordingly, the data structure here is preferably populated with information on the manufacturer, model name or number, type of processor, memory size and speed of each server. One such example is the Dell (manufacturer) PowerEdge 2600 Server (model name and number), Dual XEON Processors (type of processor), with 4 gigabytes (GB) RAM (memory size).

Information about the rooms 24 available at location 10 is also included in the data structure. Such information preferably includes data on all of the equipment contained in each room 24, such as production editing systems or computer hardware/software systems, etc. Accordingly, the data structure here is preferably populated with data on the name of the manufacturer, the model name or number, processor speed, storage capacity, software program name and version, etc. The idea here is population of the data structure with every piece of soft or hard equipment that is contained in each room 24 at location 10.

Moreover, the above room 24 information is further categorized by room type 26. In the media and television industry, broadcast corporations, for example, often have rooms that are dedicated for a particular purpose in TV or video production, such as editing, graphics, or audio. Thus, information on the room type 26 generally refers to what type of room 24 it is being used for.

Examples of room types 26 includes: (1) an editing suite, which is generally used for first-stage editing of videotapes and may comprise one or more edit controllers, editing decks, computers, and a special effects generator (SEG); (2) a master edit suite, which generally refers to high-level video post-production after the first stage of videotape editing has occurred; (3) an audio booth, which is generally used for recording the audio features of a video production; (4) an audio suite, which is generally used for editing (as opposed to recording) thereby enhancing the audio features of a video production; (5) a graphics suite refers to a room containing technical equipment to create and edit graphics elements of a video production; (6) a studio refers to a space where camera equipment are either permanently installed or brought in as needed to shoot interview or other footage in a controlled environment; and (7) a master control room generally refers to a room containing all of the technical capabilities to control the shooting of a video production in a studio b, for example, the recording and switching between cameras, such as controlling video recording, switching between cameras and manipulating graphics.

Referring now to the camera operators 16 associated with the facility 10, there is shown various classifications of data. For example, the data structure of each camera operator 16 associated with location 10 is populated with information about specialties 28, languages 30, union affiliations 32, vaccinations and clearances 36.

Generally, specialties 28 refer to the expertise area of the camera operator 16. A camera operator's expertise is usually subject matter-specific depending, for example, on the type of shoot involved, on the operator's experience with a type of camera equipment 37, etc.

Examples of specialty 28 that depends in part on the type of shoot or location includes: (1) sporting events such as golf, basketball, baseball, football, soccer, tennis, hockey, etc.; (2) surgery, as in working in medical operating rooms where surgeries are performed; (3) film and video teleprompter operator, as in handling the teleprompter device used in video, film and television that prompts news anchors/reporters/politicians on what to say; (4) factory or industrial location shooting; (5) location editing, as in remote or flypack (plug-in-and-go) editing capabilities for editing footage on location anywhere in the world without compromising video quality; (6) script-to-screen filming, as in cradle-to-grave production capabilities starting with a script, casting talent, shooting footage, adding music/title/etc., and ending with a commercial ready for viewing; (7) webstream encoder, as in handling audio and video content for web streaming a completed or live production; (8) aerials, as in camera filming in the air such as from an airplane or parachute; (9) commercials; (10) documentary; (11) duplication, as in making duplicate copies of raw shoot coverage or a completed production; (12) portable green screen, as in the handling of location shoots in such a way that allows alternate background scenes to be inserted in the background after the shoot has been completed; (13) flypack/switcher, as in the handling of plug-in-and-go production capabilities on location anywhere than can be switched to live programming in the field anywhere in the world; (14) studio, as in handling production capabilities in a workroom/facility environment dedicated for production purposes; and (15) editing, as in handling production editing capabilities in a workroom/facility environment dedicated for editing purposes.

Examples of camera operator 16 expertise that depends on the type of camera equipment 37 involved for the production shoot, are many and varied. Camera operator expertise preferably includes demonstrated experience with one or more of the camera equipment 37 illustrated below.

For example, one type of broadcast and production film/video camera equipment 37 is the HD Cam SR, which is a one-piece, high definition camcorder (hence the name HDCam) useful in digital cinema, documentaries, TV dramas and commercial programs. SR refers to superior resolution video taping/playback capability.

Another example of camera equipment 37 is the AVC Intra (NTSC), which is an Advanced Video Compression (AVC) camera in which all data compression is performed within each frame (Intra) as opposed to within a group of frames. NTSC refers to the color TV standard developed by the National Television System Committee in 1953, and is generally used to describe any video formatted for playback on NTSC TV in the United States. In this case, the AVC Intra (NTSC) camera is therefore capable of capturing video and formatting the video for playback on NTSC TV in the United States.

Yet a third example of camera equipment 37 is the AVC Intra (PAL). This camera is similar to the AVC Intra (NTSC). However, PAL is used to describe any video formatted for playback on Phase Alternating Line (PAL) TV in Western Europe and Australia. Therefore, the AVC Intra (PAL) is an Advanced Video Compression (AVC) camera that performs data compression within each frame (Intra) that is formatted to video playback on PAL TV in Western Europe and Australia instead of the United States.

A fourth example of camera equipment 37 is the HDCam (NTSC), which is similar to the HDCam SR (NTSC) but without the Superior Resolution (SR) feature.

A fifth example is the HDCam (PAL), which is a one-piece high definition camcorder (hence the name HDCam) that is formatted for video playback on PAL TV in Western Europe and Australia.

A sixth and final example of camera equipment 37 is the XDCam HD (NTSC), which is another type of high-definition camcorder formatted for video playback in NTSC TV in the United States.

Accordingly, the data structure for camera equipment 37 is preferably populated with information about the name of the camera's manufacturer, camera model 56 number/name, camera format 54, the type(s) of file format 50, acceptable type(s) of media 52, acceptable input and output 68, 70 connections, and data rates. Moreover, the data on camera equipment 37 is preferably linked to each crew company 2.

Languages 30 generally refer to which language(s) each camera operator 16 is proficient in, such as English, French, German, etc. Each camera operator 16 speaks English in addition to his/her native language and preferably multiple languages.

Union affiliations 32 refer to one or more labor unions and/or guilds each camera operator 16 is affiliated with. Union affiliations include, for example: the NABET-CWA, which stands for the National Association of Broadcasters Employees and Technicians, and which is the broadcasting and cable television workers section of the Communications Workers of America; IATSCE, which is the International Alliance of Theatrical Stage Employees, Moving Picture Technicians, Artists and Allied Crafts of the United States, its Territories and Canada, a union of professional stagehands, motion picture technicians, and allied crafts; and IBEW, which is the International Brotherhood of Electrical Workers. Additionally, each camera operator 16 may be affiliated with any local or regional or position specific unions.

Vaccinations 34 refer to the category of inoculation(s) each camera operator 16 is vaccinated with. Again, this may be a factor in a decision logic query as to whether a camera operator 16 is appropriately vaccinated for performance on/in a desired project, location, country, etc.

Security clearance is as previously discussed, except that clearance 36 is specific to the camera operator 16 whereas clearance 12 is specific to the crew company 2.

Referring now to the outputs Y of the crew company 2 in FIG. 1, there is shown three categories of possible outputs: pre-production 42, production 44 and post-production 46.

As depicted in FIG. 1, a crew company 2 is associated with a pre-production 42 output because each company 2 generally specializes in one or more program types. In other words, each output in pre-production 42 is generally for a desired type of film, movie or television shoot or programming.

Various types of shoots include, for example, reality television shows; commercial shoots; documentaries; interviews; underwater filming; live broadcast streaming; broadcast television; film production; happy face videos, which generally refer to conference or trade show footage that is edited and shown at the end of the event; industrial factory shoots; high tech or medical lab work shoots; mobile production; media tours, which generally refer to the practice of concentrating consecutive taped interviews of a celebrity or high-profile individual by one or more TV station reporters or media group in a short period of time in a studio in order to save time; media training; man-on-the-street shoots; video news release; testimonials; script-to-screen filming, as in cradle-to-grave production capabilities starting with a script, casting talent, shooting footage, adding music/title/etc., and ending with a commercial ready for viewing; and others. In other words, an output of pre-production 42 may not necessarily relate to hardware although it is possible; it is generally relational to the type of camera shoot or programming desired, though not exclusively so. As described above and following, such information is populated in the data structure of the present invention, and available for decision logic queries as desired.

On the other hand, the outputs of production 44 and post-production 46 are generally relational to some type or form of hardware or software, which may be similar or different.

For example, five outputs are represented in FIG. 1 for production 44. In context of the data structure, in the production process, a camera operator 16 shoots video footage (usually randomly) using a specific camera model 56 of a specific camera equipment 37 that is made by a specific camera manufacturer. The camera model 56, which records video in a specific camera format 54, outputs the shoot footage on media 52, via file format 50, for subsequent playback, viewing, editing and the like. Organization of the data structure of the present invention ensures that in the production process, camera model 56 of camera equipment 37 creates a video output that is compatible with one or many inputs in the post-production process, where final-stage editing of the video occurs.

The first exemplary output for production 44 is represented by additional equipment 48, which refers to any equipment in addition to a camera, that an operator 16 may employ on location in recording a shoot, although cameras are not necessarily excluded as additional equipment 48.

For example, additional equipment 48 may include: (1) a satellite truck, which is generally a mobile satellite station mounted in a truck as a platform that allows for satellite transmission from any location; (2) grip truck, which refers to mobile lighting equipment mounted on wheels; (3) camera crane, which generally refers to a boom device with a camera on one end that is used to film actors from above, from a distance, or to move the camera up and away from them; (4) camera dolly, which refers to specialized tracks that a camera is mounted on in order to create smooth camera movements; (5) studio cameras; (6) a studio control room, where film production takes place; (7) webcasting encoder that allows live event producers to capture audio and video and stream it live; etc.

Depending on the equipment 37, 48, information pertinent to that equipment populates the data structure. For example, data relevant to additional equipment 48 comprising a crane or a jib, necessarily includes data on the crane's or jib's arm length. Similarly, data relevant to a camera dolly, necessarily includes data on the length of the track that the dolly rolls on, and the type of track, such as whether the track is straight or curved. Data relevant to webcasting encoder, for example, necessarily includes specifications about the hardware and software employed.

The second exemplary output is file format 50, which, as earlier discussed, is used to describe how camera formats 54 are coded onto media 52, for example. The coding instructions in each file format 50 determine which form(s) of media 52, such as a P2 card versus tape, the video footage is storable on. Examples of file format 50 include MXF or MPEG4.

The third exemplary output is media 52, which generally refers to a portable storage device used to store and playback content, such as digital video, from a computer or another device via ports or wireless networking technology. In other words, media 52 is the physical object that video footage is recorded onto.

Various forms/types of media 52 include, for example: (1) 35 mm motion picture film, which is the most common medium for digitally projected movies; (2) 16 mm film, a less popular and shorter motion picture film; (3) hard drives; (4) Professional Plug-In (P2) memory cards; (5) secure digital high capacity (SDHC) memory cards, developed with a minimum capacity of 4 GB (gigabytes); (6) SxS (pronounced S-by-S) flash memory cards, developed for high speed data transfer; (7) XDCam optical disc, which refers to rewritable optical discs that features high capacity storage, developed for tapeless professional video systems; (8) recording tape; (9) DVD; (10) File Transfer Protocol (FTP), which is a standard network protocol used to copy a file from one host to another over a TCI/IP-based network such as the Internet;

(11) CineMag, which are hot-swappable, non-volatile memory magazines for digital, high-speed video cameras; etc.

In practice, three factors affect which type of media a camera operator 16 uses on a shoot: the camera equipment 37, the specific camera model 56 he/she uses, and the file format 50. Each camera equipment 37 and camera model 56 is configured for compatibility with certain types of media 52.

Accordingly, the data structure here is populated with information about the name of the camera's manufacturer, model number/name, the form of media 52, size/length of the media 52, recording time, file format 50, camera format 54 and the kind of input and output connections 68, 70 for that camera model 56.

The fourth exemplary output is camera format 54. As earlier discussed, camera format 54 refers to how footage is recorded within a camera equipment 37.

The fifth exemplary output is camera model 56, which refers to one or more product variations of a camera that offers different features. For example, the 35 mm film camera manufactured by Arriflex has eight different models—535A, 535, 435 Xtreme, 35-III, 2c IIc, BL4, VL3 and 3. And 35 mm film cameras are becoming obsolete because of digital technology.

Selection of camera models 56 depends on the manufacturer of the camera equipment 37. For example, a camera model 56 for a camera equipment 37 manufactured by Panasonic will vary from a camera model 56 manufactured by Canon, Arriflex or JVC.

Referring now to the post-production 46 outputs depicted in FIG. 1, there are seven illustrated. In the context of the data structure, in the post-production process, footage or images that were (usually randomly) recorded in the production process are now selected, color enhanced, slowed down or sped up, and then compiled so that they conform to match an edit or script list. Further editing is performed to add graphics, music, narration, etc., to prepare the first draft of a final video product. The end result is an approved final video product ready for public consumption.

Three of the seven post-production 46 outputs depicted in FIG. 1—additional equipment 48, media 52 and file format 50—are as previously discussed.

The fourth exemplary post-production 46 output is VTR model 58. Similar to camera model 56, VTR model 58 refers to one or more product variations of a Video Tape Recorder (VTR) that offers different features. A VTR is a tape recorder that has the capability to record video material.

Accordingly, the data structure for VTR model 58 is populated with information about the name of the VTR manufacturer, model number/name, acceptable type(s) of media 52 for each VTR 58, 60 deck, acceptable camera format(s) 54 for each VTR 58, 60 deck, acceptable camera model(s) 56 for each VTR 58, 60 deck, and acceptable input and output 68, 70 connections.

The fifth exemplary output is VTR format 60, which essentially refers to the coding or way in which digital video is recorded in a Video Tape Recorder (VTR). There are various forms of VTR formats 60 on the market, depending on the name of the VTR manufacturer. Generally, each VTR manufacturer has its own proprietary coding, and hence VTR format, for recording video.

For example, one video recording coding or VTR format 60 is the Betacam format, which records video on a cassette loaded with magnetic tape. It is manufactured by Sony. Another example of a VTR format 60 is the Digital Video Compression (DVC) Professional (PRO) high definition (HD) format, which digitally records video onto magnetic tape or P2 memory cards. This video recording coding or VTR format is developed by Panasonic and is aimed at the professional high definition market. Panasonic has developed more than one, or a family of, VTR formats 60.

The data structure for VTR format 60 is preferably populated with information about the name of the VTR manufacturer, model number/name, acceptable type(s) of media 52, acceptable camera format(s) 54, acceptable camera model(s) 56, and acceptable input and output 68, 70 connections.

The sixth exemplary output is software 62, which refers to any type of production or editing computer programs used in the film/video production and post-production process. There are many off-the-shelf production or editing software programs available on the market, such as Final Cut Pro, Adobe, Edios and Avid. Each of these software 62 works on prescribed hardware and have their own features, file size requirements and operating systems with varying levels of capabilities and ease of use. Accordingly, the data structure here is preferably populated with information about the name of the software manufacturer, version number/name, minimum computing requirements, and other acceptable/compatible software program(s).

The seventh exemplary output of post-production 46 is computer hardware 65, which refers to all the various computing hardware and malware used in the post-production process. Accordingly, this data structure is preferably populated with information about the name of the computer manufacturer, model number/name, acceptable form(s) of media 52, and acceptable/compatible input and output 68, 70 connections.

Relationally, the central hub 38 serves as a linking node between the inputs X and outputs Y of an entity, such as crew company 2. In a first aspect, as depicted, a configuration of the data structure of central hub 38 relationally ties each location 10 of a crew company 2. Consequently, an advantageous aspect of linking the central hub 38 to each location 10 is the capability to link and/or identify, for example, any equipment or software assigned/located at one or more locations 10 of crew company 2.

In a second aspect, as depicted, a configuration of the data structure of central hub 38 relationally ties the hardware and software outputs 40 of pre-production 42, production 44 and post-production 46 to each location 10. Consequently, an advantageous aspect of linking the central hub 38 to each of these outputs 40 is the capability to link and/or identify, for example, any production or post-production equipment or software assigned/located at each location 10 of crew company 2.

In a third aspect, as depicted, a configuration of the data structure of central hub 38 relationally ties the software/hardware outputs 40 of any company 2 to any type of tv/film/camera equipment on the basis of manufacturer 66, and hardware/software input 68 and output 70 connections. Consequently, an advantageous aspect of linking the central hub 38 by manufacturer 66 and input/output 68/70 connections is the capability to link and/or identify, for example, any production or post-production equipment or software manufacturer, as well as their appropriate input 68 and output 70 connections, assigned/located at each location 10 of crew company 2.

In this regard, configuring the data structure of the central hub 38 as described above, translates into the capability of identifying, for example, which file format of which model of which camera equipment made by which manufacturer having what kind of input/output connections, is available at each location 10 for a desired use. Equally valuable is the capability of preventing unnecessary and expensive on-site costs of equipment/software mismatches on location shoots because of the capability of also identifying which hardware/software outputs 40 are incompatible with which manufacturer 66 input 68 and output 70 connections. These capabilities are accomplished whether for crew company 2, client company 80, or any desired entity.

In a preferred embodiment, a configuration of the data structure of the central hub 38 also links each room type 26, translating into the capability of identifying, for example, which file format of which model of which camera equipment made by which manufacturer having what kind of input/output connections, is available in which room at each location 10 for a desired use.

Figure 2:
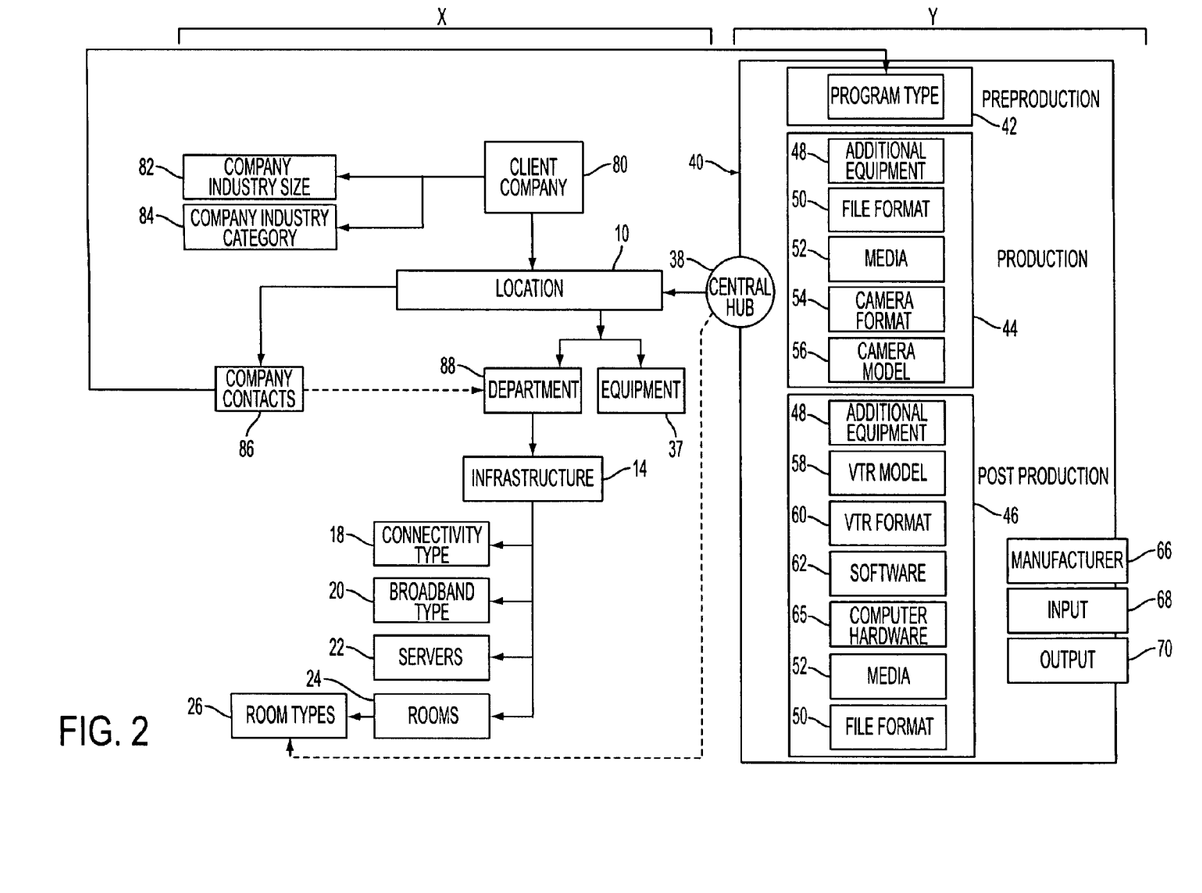
FIG. 2 is an exemplary diagram of a data structure for a second entity in accordance with a preferred embodiment of the present invention.
Figure 3:
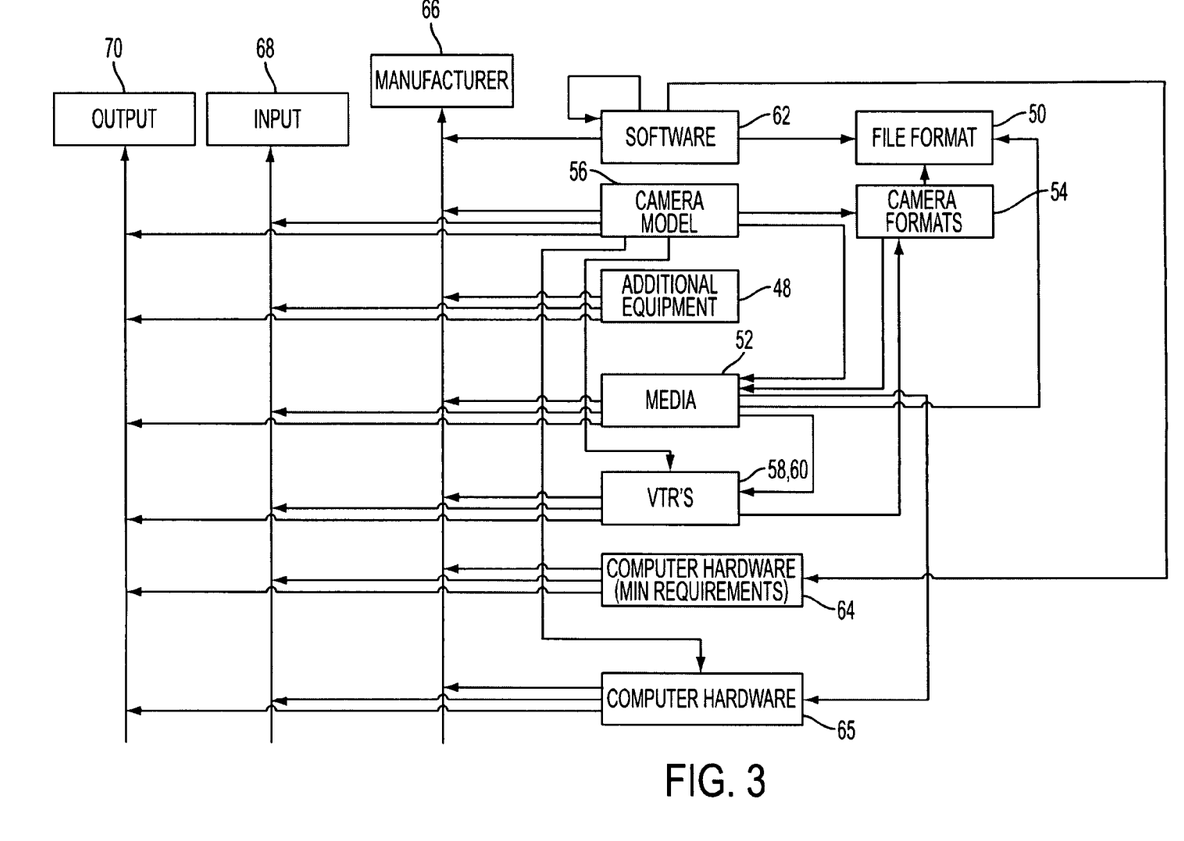
FIG. 3 is an exemplary diagram illustrating the inter-relationship of data fields of each of the first and second entities of FIGS. 1 and 2 with each other, including the manufacturer's input and output connections to the outputs of each of the first and second entities, within the data structure of the present invention.

One representation of an exemplary configuration of the data structure of the present invention, that illustrates the inter-relationships of the outputs Y of FIGS. 1 and 2 with each other, is depicted in FIG. 3.

Input 68 and output 70 connections are labeled on the left hand side of FIG. 3. For example, cameral model 56, additional equipment 48, media 52, VTRs 58, 60, and computer hardware 64 all have input 68 and output 70 connections as illustrated by pointed arrow tips at the corresponding vertical lines for input 68 and output 70. Similarly, each of the above also has a manufacturer, as illustrated by pointed arrow tips at the corresponding vertical manufacturer 66 line.

Observe, however, that software 62 does not have input 68 and output 70 connections, as illustrated by the absence of horizontal lines to the vertical input 68 and output 70 connections lines. Similarly, as depicted, a file format 50 and camera format 54 do not generally have input 68 and output 70 connections but they are relationally tied to software 62 and camera model 56, respectively. Software 62 has a manufacturer 66, as illustrated by a pointed arrow tip at the corresponding vertical manufacture 66 line.

A discussion on the other nine outputs will now be described with reference to FIG. 3.

First, with respect to software 62, in its entirety for example, FIG. 3 illustrates the existence of five inter-relational connections represented by the four lines exiting reference box 62 and the one arrow pointing into reference box 62. In other words, software 62 has five possible interactions. Each of these interactions is represented by at least one query field and relationally tied to others, in the data structure of the present invention.

Accordingly, software 62 has: (1) a manufacturer 66 such as Microsoft®; Adobe®, which Photoshop Creative Suite is an editing, compositing and painting software for creating and enhancing motion-based content; Apple®, which Final Cut Pro software is an all-in-one video editing, compositing and special effects package for the Macintosh computer; and the like; (2) and is a self-referencing entity, as depicted by the arrow leaving and re-entering box 62, because of the inherent compatibility interactions between one software and its version(s), with another software or operating system; (3) minimum requirements of compatibility to computer hardware 64, such as memory size, processor speed, disc space, operating system; and (4) specific file format 50 outputs.

In other words, software 62 is capable of generating multiple file formats 50 depending on the type of software employed. For example, the image file format 50 generated by Adobe® Reader® is a Portable Document Format (PDF) file. By the same token, the image file formats 50 generated by Adobe® Photoshop® include Joint Photographic Experts Group (JPG or JPEG) files, Portable Networks Graphic (PNG) files, Encapsulated Postcript (EPS) files, Photoshop Document (PSD) files, and various other file formats 50.

Second, with respect to camera model 56, seven inter-relational connections are depicted, represented by the seven lines exiting reference box 56. In other words, camera model 56 has seven possible interactions, each of which is represented by at least one query field and relationally tied to others, in the data structure of the present invention.

More specifically, the camera model 56: (1) has a manufacturer 66, such as Panasonic, Sony, Canon, JVC, Philips, etc.; (2) input 68 connections, which generally refer to cabled accessory or peripheral devices insertable into physical slots into a camera, for example. These connections usually take the form of a one-cable external connector, much like the universal serial bus (USB) that connects smart phones to a computer. For cameras in the video production industry, input 68 connections include, for example: (a) USB 2.0, a high-speed version that plugs into a camera's USB port; (b) FireWire® 400 or 800, which is the external cable connector for high-end, professional audio and video equipment that plugs into a camera's FireWire® port. FireWire® 400 transfers about four times the maximum transfer rate of a USB 2.0, and FireWire® 800 transfers twice as fast as the FireWire® 400; and (c) eSATA (external Serial Advanced Technology Attachment), which is another external cable connector for connecting camera equipment to mass storage devices such as hard disk drives and optical drives.

Camera model 56: (3) also has output 70 connections. Output 70 connections is similar to input 68 connections because the same external cable connector or disc is used through which shoot footage is transmitted, outputted or delivered; (4) is configured to connect to one or more compatible video tape recorders (VTRs) 58, 60 using, for example, a USB of FireWiree external cable connector, as described above; (5) is also configured to connect to one or more compatible forms of media 52, such as film (35 mm or 16 mm), P2 memory cards, etc., as described above; (6) depends on the camera's manufacturer as to how many models 56 are available on the market; and (7) is connectable to one or more computer hardware 64 via peripherals or accessory devices described above. Computer hardware 64 comprises a desk top, lap top, and the like.

Third, with respect to additional equipment 48, there is shown three inter-relational connections as depicted by the three lines exiting reference box 48. Accordingly, additional equipment 48 has: (1) one or more manufacturers 66, such as EX FX, Kessler Crane®, Glidecam and Strada Crane. Depending on the type of additional equipment, there may or may not have (2) input 68 connections and output 70 connections. For additional equipments 28 such as cranes or jibs, there are no input/output 68,70 connections, for example. Each of the these three possible interactions is represented by at least one query field and relationally tied to others, in the data structure of the present invention.

Fourth, with respect to media 52, there is shown eight inter-relational connections as depicted by the six lines exiting reference box 52, and the two lines entering box 52. Consequently, the data structure is populated with information at least representing these eight lines: (1) manufacturer; (2) input 68 connections; (3) output 70 connections; (4) which media 52 is acceptable into which VTR 58, 60 deck; (5) acceptable media 52 for each file format 50; (6) acceptable media 52 for each computer hardware 65; (7) acceptable camera format 54 that shoots to acceptable type of media 52; and (8) acceptable media 52 for each camera model 56. Further information about media 52 is as described above.

More specifically, media 52: (1) has a manufacturer 66, such as Panasonic, Sony, Canon, JVC, Philips, etc.; (2) input 68 connections, such as one or more external cable connectors described above; (3) output 70 connections, such as one or more external cable connectors described above; (4) is configured to connect to one or more video tape recorders (VTRs) 58, 60 depending on media/VTR type compatibility; (5) accepts one or more compatible file formats 50; and (6) is connectable to computer hardware 64 such as a desk-top or lap top computer, hard drive, etc.

(7) In addition, compatibility of media 52 depends on a camera format 54, as evidenced by the arrow pointing from camera formats 54 into media 52 in FIG. 3. (8) Similarly, the direction of the arrow from camera model 56 into the media 52, signifies that the type of camera model 56 dictates the acceptable/compatible form of usable media 52.

Fifth, with respect to the video tape recorders VTRs 58, 60, FIG. 3 illustrates the existence of six inter-relational connections represented by the four lines exiting reference box 58, 60 and the two arrows pointing into reference box 58, 60. In other words, VTRs 58, 60 has six possible interactions. Each of these interactions is represented by at least one query field and relationally tied to others, in the data structure of the present invention.

Accordingly, VTRs 58, 60: (1) has a manufacturer 66 such as JVC, Panasonic, Sony, etc.; (2) input 68 connections, such as the external cable connectors described above; (3) output 70 connections, such as the external cable connectors described above; (4) supports one or more camera formats 54; (5) is equipped for compatible connection to camera model 56 via the external cable connectors described above; and (6) is equipped to support different types of media 52 via the external cable connectors described above.

Sixth, with respect to computer hardware 64, there is shown four inter-relational connections as depicted by the three lines exiting reference box 64, and the one line pointing into box 64. These four interactions are each represented by at least one query field and relationally tied to others, in the data structure of the present invention.

More specifically, computer hardware 64: (1) has a manufacturer such as Dell, Acer, IBM, etc.; (2) input 68 connections, such as USB 2.0, FireWire 400 and the other external cable connectors described above; and (3) output 70 connections, such as such as USB 2.0, FireWire 400 and the other external cable connectors described above.

In addition, the arrowed line pointing from software into reference box 64 signifies another inter-relationship being tracked, and the need for computer hardware 64 to have the minimum specifications or requirements of compatibility to run software 62. For example, Adobe®PhotoShop® CS4 is incompatible to run on a Pentium I computer. These minimum requirements includes data on memory size, operating system, processor, disc space, and the like, all of which are populated in the data structure.

Seventh, with respect to computer hardware 65, there is shown five inter-relational connections as depicted by the three lines exiting reference box 64, and the two lines pointing into box 65. As is the case with each Y output, these interactions are each represented by at least one query field and relationally tied to others, in the data structure of the present invention.

The manufacturer 66 and input/output 68, 70 connections are as described above. The arrowed line pointing from camera model 56 into computer hardware 65 indicates the latter is equipped for compatible connection to camera model 56 via the external cable connectors described above. Also, the arrowed line pointing from media into computer hardware 65 indicates that the latter is equipped to support different types of media 52 via the external cable connectors or ports described above.

Eighth, with respect to file format 50, three inter-relational connections are depicted, represented by the three lines pointing into reference box 50; one from software 62, one from camera formats 54 and one from media 52. More specifically, file format 50 supports one or more software 62, camera formats 54 and forms of media 52. Each of these interactions is represented by at least one query field and relationally tied to others, in the data structure of the present invention.

Ninth and finally, with respect to camera formats 54, FIG. 3 illustrates the existence of three inter-relational connections represented by the one arrowed line exiting reference box 54, and the two lines pointing into box 54. For example, the line exiting box 54 and entering box 52 signifies that each camera format 54 records film/video footage using certain type(s) of media 52. The arrowed line leaving box 56 and entering box 54 signifies that each camera format 54 supports one or more camera models 56. The arrowed line leaving box 58, 60 and entering box 54 signifies that each camera format 54 supports one or more VTRs 58, 60.

It is important to recognize that there are multiple forms of media 52, file format 50, camera format 54, camera models 56, and camera equipment 37, all of which are compatible with each other. For instance the type of media 52 may limit one or more of file format 50, camera format 54, camera model 56 and camera equipment 37, depending on the interaction. Similarly, file format 50 may limit media 52, camera format 54, camera model 56 and camera equipment 37. When one element limits the nature of interaction on the other, footage may be prevented from being viewed or edited thereby creating incompatibility issues.

By way of illustration, for instance, footage is generally shot with camera equipment 37 made by a specific camera manufacturer on a specific camera model 56, which is configured to record the shoot on certain types of media 52, such as a P2 card or tape. In the instance where a camera operator 16 uses a Panasonic camera, which shoots video onto a P2 memory card, the output is a P2 card. In order for the video shoot to be edited in the post-production process or stage, a P2 card reader must be employed in order to view and edit the footage. Accordingly, each output of a file format 50 by camera model 56 of camera equipment 37 manufacturer requires compatibility with one or more different inputs in the post-production phase. In a preferred embodiment, the data structure of the present invention relationally links each of these inputs and outputs by compatibility combinations and restrictions to prevent incompatibility interactions, thereby reducing considerable expense.

Referring again to the instance of media 52, there are eight possible interactive relationships, and depending on what kind of media 52 is identified or employed, will determine the nature of those eight relationships. This relationship rationale holds true for each of the hard or soft equipment associated with the central hub 38. Accordingly, an advantageous aspect of the data structure of the present invention is organization of the inter-relationships of each of the above discussed equipment/software with each other, in such a way that interaction incompatibility is prevented.

As illustrated, with reference to the data structure of the present invention, use of a computer 64 on a shoot, for example, requires data on the three arrows exiting reference box 64, and the two arrows entering reference box 64. More specifically, as to the three exiting arrows, use of a computer on a shoot, requires data population about the computer's manufacturer 66 (i.e. Dell, Hewlett Packard, Sony, Toshiba, etc.), its input 68 connection(s) (i.e. USB port, FireWire® port, etc.) and its output 70 connection(s) (i.e. BNC out, FireWire® 400, FireWire® 800, etc.). Additionally, as to the two entering arrows, use of a computer 64 on a shoot, requires data about: the software 62 program(s) running on the computer, including the software's capabilities, minimum requirements, and the like; and compatible media 52, such as the number and types of media connection capabilities.

Similarly, if camera equipment 37 is used for a desired shoot, data about the camera's manufacturer 66 as well as its file formats 50, and acceptable/compatible media 52 and input/output 68, 70 connections are populated in the data structure. Dissimilarly, software 62 does not have any input 68 or output 70 connections because it does not have openings to plug into. However, as described above, software 62 has a manufacturer 66, such as Microsoft, and outputs file formats 50, which data are populated in the data structure.

Referring now to FIG. 2, there is shown an exemplary diagram of a data structure for a second entity in accordance with a preferred embodiment of the present invention. For discussion purposes, the second entity is labeled a client company 80. Inputs of the client company 80 is represented by X, and the outputs by Y.

The data structure is populated by various pieces of information about a client company 80. For example, as depicted, information about the company's industry size 82 and industry category 84 are included. Company industry size 82 is preferably classified as a Fortune 100, 500, 1,000 or other company. Other-type companies may include independent producers, independent production companies, associations, non-profit organizations and educational institutions.

Company industry category 84 generally refers to categories of business operations, such as advertising/marketing/public relations firms, aerospace/defense manufacturers, agriculture, associations and/or labor unions, automotive retail/services, biotechnology, computer software, communications such as cable/internet/radio/phone, computers hardware/office equipment, education, construction/farm/industrial machinery, consultants/attorneys, energy/utilities/gas/electric, engineering, and the like.

Like a crew company 2, a client company 80 may have one or more locations or facilities 10 in which it operates. Each location 10 is preferably defined by its name, address, city, state, zip code and country, and is generally organized into one or more departments 88 having one or more company contacts 86. The data structure of the present invention does not rely on departmental hierarchy. The infrastructure 14, central hub 38, and the outputs of the client company 80 also represented by Y, are as previously described with reference to FIG. 1. Accordingly, similar inter-relationships as depicted by FIG. 3 and described above, exist for client company 80 as well.

Operationally, the system of the present invention manages data on each camera operator 16 and by consequence the crew company 2 affiliated or associated with the camera operator 16. For example, data on each camera operator 16 includes information regarding their specialties 28, languages 30, union affiliations 32, vaccinations 34, clearances 36 and camera equipment 37 as previously discussed.

In another aspect, the present invention manages data on each client company 80 such as all of the company contacts 86, its industry size 82 and category 84, locations 10, as well as all the department 88 and infrastructure 14 information.

In yet another aspect, the present invention manipulates, captures and manages data involving each crew company 2, client company 80 and camera operator 16 such as, for example, the company's certifications 4, crew size 6, crew categories 8, clearances 12, locations 10, industry size 82, industry category 84, company contacts 86, etc.

In yet another aspect, the present invention manipulates, captures and manages data on all of the hard and soft equipment each company 2, 80 and camera operator 16 crew owns/uses/has.

It is important to recognize that the present invention, as exemplified herein, has many applications and is applicable to many industries. For example, as illustrated, the present invention is usable to support: (1) industry trending and forecasting; (2) business reporting and analysis; (3) extensive searching features and functions; (4) website administration and support features and functionalities; (5) contact management applications; (6) crew management applications; (7) company management applications; (8) work order applications; (9) invoicing and billing applications; (10) performance indicator applications; (11) order management applications; (12) contract management applications; etc.

Having now described a few embodiments of the invention, it should be apparent to those skilled in the art that the foregoing is merely illustrative and not limiting, having been presented by way of example. Numerous modification and other embodiments are within the scope of the invention and any equivalents thereto. It can be appreciated that variations to the present invention would be readily apparent to those skilled in the art, and the present invention is intended to include those alternatives.

Further, since numerous modifications will readily occur to those skilled in the art, it is not desired to limit the invention to the exact construction and operation illustrated and described, and accordingly, all suitable modifications and equivalents may be resorted to as falling within the scope of the invention.

What is claimed is:

1. A computer-implemented data analytics method for manipulating and analyzing data to prevent incompatibility between a first media group and a second media group, comprising:
   configuring a data structure with two or more types of fields;
   populating the data structure by various pieces of information about the first media group, the various pieces of information about the first media group comprising file format, camera model, media type, camera's manufacturer, camera input/output, and location;
   populating the data structure by various pieces of information about the second media group, the various pieces of information about the second media group comprising camera format, media type, production and post-production equipment input/output, geographic region;
   relationally linking the two or more type of fields based on one or more functionalities of the respective fields;
   providing a negative limitation on the two or more types of fields to prevent incompatibilities between the first media group and the second media group; and
   identifying, which media type, which file format of which model of which camera equipment made by which manufacturer having what kind of input/output connections, is available at each location for a desired use.

2. The method according to claim 1, further comprising limiting a populated file format field based on a populated camera format field.

3. The method according to claim 1, further comprising limiting a populated video tape recorder field based on a populated camera format field.

4. The method according to claim 1, further comprising relationally linking at least one of file format field and media field; and limiting a populated media field based on a camera model field.

5. The method according to claim 1, further comprising relationally linking at least one of a file format field and a media field; and limiting a populated media field based on the camera format field.

6. The method according to claim 1, further comprising relationally linking at least one of a file format field and a media field; and limiting a populated file format field based on a populated media field.

7. The method according to claim 1, further comprising relationally linking at least one of a media field and a video tape recorder field; and limiting a populated video tape recorder field based on a populated media field.

8. The method according to claim 1, further comprising relationally linking at least one of a media field and a computer hardware field; and limiting a populated computer hardware field based on a populated media field.

9. The method according to claim 1, further comprising relationally linking a software field and a file format field; and limiting a populated file format field based on a populated software field.

10. The method according to claim 1, further comprising relationally linking at least one camera input field and output field with at least one of a production and post-production equipment input field and output field; and limiting a populated at least one of the production equipment field and post-production equipment field based on a populated at least one camera input field and output field.

11. The method according to claim 1, further comprising relationally linking at least one camera input field and output field with at least one of a production media field and post-production media field; and limiting a populated at least one of the production media field and post-production media field based on a populated at least one camera input field and output field.

12. The method according to claim 1, further comprising limiting a populated camera format field by a camera model.

13. A computer-implemented data analytics method for manipulating and analyzing data to prevent incompatibility between a first media group and a second media group, comprising:
configuring a data structure with two or more types of fields;
populating the data structure by various pieces of information about the first media group, the various pieces of information about the first media group comprising file format, camera model, media type, camera's manufacturer, camera input/output, and location;
populating the data structure by various pieces of information about the second media group, the various pieces of information about the first media group comprising camera format, media type, production and post-production equipment input/output, and geographic region;
relationally linking the two or more type of fields based on one or more functionalities of the respective fields for managing camera operating shooting capability in terms of subject matter expertise;
relationally linking at least one of a camera operator field, an operator specialty field, and a camera model field;
limiting a populated operator specialty field based on a populated camera operator field; and
identifying, which media type, which file format of which model of which camera equipment made by which manufacturer having what kind of input/output connections, is available at each location for a desired use.

14. The method according to claim 13, further comprising limiting a populated camera model field based on a populated camera operator field.

15. The method according to claim 13, further comprising relationally linking at least one of a location field and a geographic region field; and limiting a populated geographic region field based on a populated location field.

16. A computer-implemented data analytics method for manipulating and analyzing data to prevent incompatibility between a first media group and second media group, comprising:
configuring a data structure with two or more types of fields;
populating the data structure by various pieces of information about the first media group, the various pieces of information about the first media group comprising file format, camera model, media type, camera's manufacturer, camera input/output, and location;
populating the data structure by various pieces of information about the second media group, the various pieces of information about the first media group comprising camera format, media type, production and post-production equipment input/output, and geographic region;
relationally linking the two or more type of fields based on one or more functionalities of the respective fields for managing equipment in terms of at least one compatible input and output;
relationally linking at least one of manufacturer, model, and equipment format;
limiting a populated equipment format field based on a populated model field; and
identifying, which media type, which file format of which model of which camera equipment made by which manufacturer having what kind of input/output connections, is available at each location for a desired use.

17. The method according to claim 16, further comprising limiting a populated file format field based on a populated equipment format field.

18. The method according to claim 16, further comprising limiting a populated compatibility with another equipment format field based on a populated equipment field.

19. The method according to claim 16, further comprising relationally linking at least one of a file format field and a media field; and limiting a populated media field based on a populated equipment model field.

20. The method according to claim 16, further comprising relationally linking at least one of a file format field and a media field; and limiting a populated media field based on a populated equipment format field.

21. The method according to claim 16, further comprising relationally linking at least one of a file format field and a media field; and limiting a populated file format field based on a media field.

22. The method according to claim 16, further comprising relationally linking at least one of a media field and another equipment field; and limiting a populated another equipment based on a populated media field.

23. The method according to claim 16, further comprising relationally linking at least one of a media field and a computer hardware field; and limiting a populated computer hardware field based on the media field.

24. The method according to claim 16, further comprising relationally linking a software field; and limiting a populated file format field based on the software field.

25. The method according to claim 16, further comprising relationally linking at least one equipment input and output with at least one of production and post-production equipment input and output; and limiting the equipment input based on the equipment output.

26. The method according to claim 16, further comprising relationally linking at least one equipment input and output with at least one of production field and post-production media field; and limiting a populated media field based on the at least one equipment output.

27. The method according to claim 16, further comprising relationally linking at least one equipment input and output with at least one of production field and post-production media field; and limiting a popluated post-production media field based on the at least one equipment output.

* * * * *